United States Patent
Sonnenberg

(10) Patent No.: US 9,719,823 B2
(45) Date of Patent: Aug. 1, 2017

(54) GAS METER

(71) Applicant: HYDROMETER GMBH, Ansbach (DE)

(72) Inventor: Hans-Michael Sonnenberg, Ansbach (DE)

(73) Assignee: HYDROMETER GMBH, Ansbach (DE)

( * ) Notice: Subject to any disclaimer, the term of this patent is extended or adjusted under 35 U.S.C. 154(b) by 431 days.

(21) Appl. No.: 14/350,444

(22) PCT Filed: Oct. 5, 2012

(86) PCT No.: PCT/EP2012/004184
§ 371 (c)(1),
(2) Date: Apr. 8, 2014

(87) PCT Pub. No.: WO2013/053453
PCT Pub. Date: Apr. 18, 2013

(65) Prior Publication Data
US 2014/0251003 A1    Sep. 11, 2014

(30) Foreign Application Priority Data

Oct. 12, 2011 (DE) .......... 10 2011 115 768

(51) Int. Cl.
*G01F 1/68* (2006.01)
*G01F 1/684* (2006.01)
*G01F 5/00* (2006.01)
*G01F 15/12* (2006.01)

(52) U.S. Cl.
CPC .............. *G01F 1/68* (2013.01); *G01F 1/6842* (2013.01); *G01F 5/00* (2013.01); *G01F 15/125* (2013.01)

(58) Field of Classification Search
CPC ........ G01F 15/68; G01F 15/684; G01F 15/12; G01F 15/125; G01F 15/185
USPC ....................................... 73/204.11
See application file for complete search history.

(56) References Cited

U.S. PATENT DOCUMENTS

| | | | |
|---|---|---|---|
| 4,381,668 A | 5/1983 | Sato et al. | |
| 4,395,907 A | 8/1983 | Morita et al. | |
| 4,981,035 A | 1/1991 | Hall | |
| 4,982,602 A | 1/1991 | Stiefel et al. | |
| 5,167,147 A | 12/1992 | Peters et al. | |

(Continued)

FOREIGN PATENT DOCUMENTS

| | | |
|---|---|---|
| DE | 3044152 A1 | 7/1981 |
| DE | 3636930 A1 | 5/1988 |

(Continued)

OTHER PUBLICATIONS

International Search Report dated Feb. 6, 2013 issued in PCT/EP2012/004184.

*Primary Examiner* — David M Gray
*Assistant Examiner* — Andrew V Do
(74) *Attorney, Agent, or Firm* — Scully Scott Murphy and Presser

(57) ABSTRACT

A gas meter is provided. The gas meter has a gas inlet, a gas outlet and a measuring section. A measuring device for thermal flow measurement can be arranged in the measuring section. A filtering device for removing particulate impurities is arranged downstream of the gas inlet. Gas diverted from the main gas flow is supplied to the filtering device for purifying the gas. After the purification, the purified gas is fed to the measuring device arranged downstream of the filtering device.

21 Claims, 8 Drawing Sheets

(56) References Cited

U.S. PATENT DOCUMENTS

| | | | |
|---|---|---|---|
| 5,220,830 A | 6/1993 | Bonne | |
| 2003/0094041 A1 | 5/2003 | Iwaki et al. | |
| 2009/0188303 A1 | 7/2009 | Ooishi | |
| 2010/0175468 A1 | 7/2010 | Anzai et al. | |

FOREIGN PATENT DOCUMENTS

| | | |
|---|---|---|
| DE | 3905746 A1 | 8/1990 |
| DE | 3922489 A1 | 1/1991 |
| EP | 0 522 757 A1 | 1/1993 |
| EP | 0 987 526 A2 | 3/2000 |
| JP | 2000-304585 A | 11/2000 |
| WO | WO 2013053453 A1 | 4/2013 |

GAS METER

BACKGROUND

A gas meter, comprising a meter housing having a gas inlet, a gas outlet and a measuring section, in which a measuring device, in particular a measuring device for thermal flow measurement, is arranged, wherein a filtering device for removing particulate impurities is arranged downstream of the gas inlet and wherein the filtering device is supplied with and purifies only a gas portion which is diverted from the main gas flow, after which the purified gas portion is fed to the measuring device arranged downstream of the filtering device.

Using the measuring device integrated into them, gas meters are used to determine the quantity of flowing gas which enters via the gas inlet in the housing and passes into the measuring section, where the flow is detected by means of the measuring device, after which the gas reemerges via the gas outlet in the housing. In modern gas meters, thermal flow meters, sometimes also referred to as microthermal sensors, are used as measuring devices. This is an electronic flow meter operating on a thermal or calorimetric measuring principle. A sensor of this kind comprises a heating element and two temperature sensors, of which one is arranged upstream of the heating element and the other is arranged downstream of the heating element, when viewed in the direction of flow. There is a temperature difference measured between the two temperature sensors, depending on the flow velocity of the gas flowing past and hence depending on the flowing gas quantity, and this difference is evaluated in order to determine the flow rate. The principle of a thermal flow sensor of this kind is known.

To ensure that a flow sensor of this kind, which normally delivers highly accurate measured values, actually operates with corresponding precision, it is necessary to keep any contaminants away from the sensor since such contaminants have a negative effect on the result of measurement. For this purpose, it is a known practice with known gas meters of this kind to precipitate particulate impurities, i.e. dust particles and the like entrained in the gas, by means of a filtering device arranged downstream of the gas inlet and upstream of the measuring section or measuring device, e.g. by means of a filter element or a particulate trap, e.g. a cyclone dust separator or the like. However, there is the problem here that very small particles and fine dust can be removed only with difficulty by means of fluid-mechanical filtering devices, for example, and therefore the filtering device has to be of very complex design to remove even the finest particles. This is because such extremely high purity of the gas is ultimately necessary since even particles with a size of 5 µm can impair the accuracy of measurement of the microthermal flow meter. That is to say, such sensors are not sufficiently robust with respect to such impurities. However, if correspondingly complex filters are used, the resulting pressure loss between the region upstream and the region downstream of the filtering device is too high, and this is likewise not desirable, especially since there is the risk that such a filtering device will become blocked.

US 2010/0175468 A1 discloses a fluid flow meter in which there is, upstream of an orifice plate, a flow branch, which is passed through a filtering device and a measuring device and returned back into the main flow duct downstream of the orifice plate.

In the gas meter according to U.S. Pat. No. 4,381,668, a part of the gas flow upstream of a tube constriction is passed through a filter element into a measuring section and is then passed back into the main flow at the level of the tube constriction.

DE 39 05 746 A1 and DE 39 22 489 A1 disclose air meters in which a part of the air flow is passed through a bypass duct, in which it is filtered and then its flow rate is measured.

Dividing a flow to be measured into a main flow and one or more measurement flows with filtering in the partial flow is also known from US 2009/0188303 A1 and DE 36 36 930 A1.

The problem underlying the invention is to specify a gas meter which allows very good purification of the gas fed to the measuring device while simultaneously avoiding an excessive pressure loss due to the purification.

SUMMARY

To solve this problem, provision is made according to the invention for a gas-permeable connection to the main gas flow in the form of a feed opening, a tube section or an opening arranged downstream of the filtering device and upstream of the measuring device, to be provided, with the result that the purified gas portion is fed back at least in part into the main gas flow upstream of a backpressure element serving to adapt the flow in the measuring section.

In the gas meter according to the invention, the overall gas flow supplied is divided into two partial flows, wherein one partial gas flow is fed to the filtering device, where it is purified. This gas portion supplied is just a fraction of the total quantity of gas flowing in. In the filtering device, this small gas portion can be purified and, in particular, even small and very small particles can be removed since treating just a small gas portion does not have a disadvantageous effect on the pressure conditions in the gas meter or in the region in which the main gas portion is flowing. The purified gas portion is then fed to the measuring device arranged downstream of the filtering device (preferably a measuring device for thermal flow measurement, which is ideally integrated on a chip element), it being possible to accomplish this in different ways, as further explained below. That is to say that 100% or, at any rate, the majority of the extremely pure gas portion is fed to the measuring device, depending on the method of supply, ultimately depending on the meter design described below. Since, accordingly, impurities no longer enter the region of the microthermal measuring device, there are consequently also no inaccuracies in measurement resulting therefrom. On the other hand, however, since only a very small quantity is filtered in such a way that even the finest particles in the range of just a few µm are removed, it is ensured that no pressure losses due to purification, resulting in turn in disadvantageous effects, occur.

The gas portion is, of course, fed back to the main gas flow, this essentially taking place directly upstream of the measuring device or downstream thereof, if appropriate downstream of a backpressure element, as will be further explained below. According to the invention, provision is made for the return of at least a part of the gas portion into the main gas flow to take place upstream of a backpressure element serving to adapt the flow in the measuring section (a backpressure element of this kind is always provided upstream and downstream of the measuring section in order to establish the required pressure conditions). For this purpose, a gas-permeable connection to the main gas flow, which is arranged downstream of the filtering device and upstream of the measuring device and is in the form of a feed opening, a tube section or an opening, is provided.

As a development of the invention, a prefiltering device, which prefilters all the gas fed in, can be arranged upstream of the filtering device, and the gas portion fed to the filtering device is taken from the prefiltered gas. This embodiment of the invention uses prefiltering to ensure that all the gas flowing through the gas meter and leaving said meter is always prefiltered and, in particular, that 90% or more of relatively large or large particles are removed. However, according to the invention, the gas portion to be filtered very finely in the filtering device is now taken from this prefiltered gas and fed to the filtering device, where the fine dust filtering then takes place in a second filtering step. A prefilter of this kind can be a fluid-mechanical separator, for example, e.g. a dust separator or the like operating on a cyclone basis.

As a development of the invention, the filtering device removing the fine dust can comprise a chamber into which, if appropriate prefiltered, gas flows, wherein the chamber itself is designed as a filter and/or a filter element is assigned to the chamber, in particular in the region of the gas inlet. This chamber is separated from the surroundings of the meter by one or more suitably shaped walls, ensuring that only a small quantity of gas, namely the gas portion to be purified, can flow into the chamber. The chamber itself can be embodied as a separation chamber, e.g. in the form of a creep flow trap with a very low flow velocity, and the chamber is, of course, also assigned a separate filter element which has a sufficiently large filter cross section.

As a development of the invention, provision can be made for the measuring device to be arranged in a bypass duct which communicates directly or indirectly with the filtering device. Only a relatively small quantity of gas enters this bypass duct and, depending on the embodiment, which will be further explained below, this quantity consists almost completely or completely of the gas purified in the filtering device. In all cases, the outlet end of the bypass duct opens into a tube in which the, if appropriate prefiltered, main gas flow is carried, that is to say that the gas fed to the measuring device is in all cases fed back to the main gas flow. When viewed in the direction of flow, the bypass duct opens downstream of a backpressure element or orifice plate, which is integrated into the tube carrying the main gas flow.

According to the invention, the high-purity gas portion can be fed into the bypass and hence to the measuring section in different ways.

According to a first alternative of the invention, the bypass duct can open, on the one hand, directly into the chamber of the filtering device and, on the other hand, into the tube carrying the, if appropriate prefiltered, gas. In this embodiment of the invention, the bypass duct consequently communicates directly with the filtering device or chamber, that is to say that only 100% high-purity gas, namely the gas portion purified in the filtering device, is directed into the bypass.

To harmonize the inflow conditions into the bypass, there is the possibility in this embodiment of the invention for at least one feed opening to lead from the chamber into the tube in which the main gas flow is carried. This makes it possible to direct some high-purity gas into the tube upstream of the backpressure element or orifice plate, wherein, of course, this single feed opening or plurality of feed openings is configured in such a way that there is always a higher pressure in the chamber containing purified gas than in the tube carrying the main gas flow upstream of the backpressure element or orifice plate, since otherwise "contaminated gas" could flow back into the chamber from the tube. In the design of the feed opening(s), it is absolutely essential to ensure that the pressure conditions in the tube, the chamber and the bypass remain constant, and the flows in the relevant zones are ideally laminar.

In contrast, an alternative to the direct branching of the bypass duct from the chamber of the filtering device envisages that the bypass branches off from the tube carrying the, if appropriate prefiltered, gas, wherein the filtering device has a feed opening which leads into the tube upstream of the branch for the gas and via which the purified gas portion is fed to the gas flowing in the tube. In this embodiment of the invention, therefore, the bypass branches off from the tube in the region upstream of the backpressure element or orifice plate and opens in the region downstream of the backpressure element or orifice plate. Thus, it communicates only indirectly with the chamber inasmuch as a feed opening leads from the chamber into the tube and opens there into a region directly upstream of the branch for the bypass duct. Via this feed opening, the high-purity gas from the chamber is selectively injected, i.e. it is introduced just upstream of the point of removal of the measurement gas entering the bypass. This high-purity inflowing gas then displaces the still particle-laden gas of the main gas flow without significantly affecting the fluid mechanics and pressure conditions in the region of the point of removal, i.e. the branch to the bypass duct. Since the high-purity gas is introduced directly at the tube wall, it consequently flows the very short distance to the branch for the bypass along the tube wall and then passes directly into the bypass duct, thus ultimately allowing virtually 100% high-purity gas to be fed to the measuring device.

The gas feed from the chamber is accomplished by means of a partial vacuum at the tube wall in the vicinity of the mouth of the feed opening, with the result that high-purity gas is drawn into the main gas flow. It slides along the tube wall and merges into the overall flow pattern without affecting the latter as a whole, until it reaches the branch for the bypass duct and enters the latter. Ideally, the flow does not mix between the flow inlet at the feed opening and the branch into the bypass duct, the effect being that virtually 100% high-purity gas enters the bypass duct. Here, therefore, there is selective local injection of the high-purity gas, and, here too, only a fraction of the total gas has to be purified in order to achieve the advantages according to the invention, namely, on the one hand, particle-free measurement and, on the other hand, no variation in the given pressure conditions.

Finally, a third alternative of the invention envisages once again injecting a high-purity gas flow into the gas flowing in the tube via a feed opening, but here the measuring device is arranged on the wall of the tube carrying the, if appropriate prepurified, gas. A bypass duct in which the measuring device is arranged is not provided here. In this embodiment of the invention too, the injection of the high-purity gas portion, i.e. the feed opening itself, is arranged directly upstream of the measuring device. Here too, the high-purity gas drawn into the tube owing to the partial local vacuum flows along the tube wall and passes across the measuring device, ensuring that said measuring device is supplied almost exclusively with high-purity gas since there is virtually no mixing between the flow of the gas portion and the flow of the main gas. Here too, injection takes place directly upstream of the measuring device, as in the above-described embodiment having the bypass duct.

If the filtering device has a corresponding filter chamber, it is expedient if a duct leads from the chamber to the feed opening. This feed opening can be embodied as a simple round hole, for example, but design as a slot extending transversely to the longitudinal axis of the tube, and therefore as a kind of slotted nozzle, is also conceivable, thus allowing the high-purity gas portion to be fed in with a certain width of flow. The width of the slot can correspond, for example, to the diameter of the branching bypass duct or to the width of the measuring device, that is to say normally of the chip which has the microthermal sensor system.

It is expedient if a flow guiding device, by means of which the inflowing gas portion is deflected in the direction of the bypass duct or of the measuring device, is provided in the region of the feed opening. By means of this flow guiding device, e.g. an appropriate edge or the like to deflect the gas flow, a distinct direction of flow parallel to the tube wall and hence parallel to the direction of flow of the main gas is expediently already impressed upon the gas flow, thus ensuring that the high-purity gas flows directly along the wall to the bypass duct branch or measuring device, depending on the embodiment of the invention.

According to another variant embodiment, the filtering device can open upstream of a backpressure element, directly upstream of which the measuring device is arranged or into which the measuring device is integrated in a duct, and to which the main gas flow is fed, or can be connected thereto. Here, therefore, the high-purity gas portion is either fed to the main gas flow directly upstream of the backpressure element, upstream of which the measuring device is arranged or into which the measuring device is integrated. The gas portion fed in once again locally displaces the main gas, with the result that (virtually) 100% high-purity gas is again fed to the measuring device, despite being fed into the main gas flow. It is also conceivable to integrate the measuring device into the backpressure element in a suitable duct, wherein the filtering device opens upstream and as an extension of said duct. As an alternative, however, it is also possible for the filtering device to be connected to the backpressure element and to the duct containing the measuring device, with the result that this duct as it were forms a bypass to which the filtering device is directly coupled and which is supplied directly with pure measurement gas.

In this case, the filtering device can branch off from a tube carrying the, if appropriate prefiltered, gas or can have a gas inlet section open toward the housing volume of the gas meter. According to the first alternative, the filtering device branches off from the inlet tube by means of a tube section, preferably at 90°, and runs to the backpressure element. According to the second alternative, an inlet section of the filtering device can also be open toward the volume, wherein the given pressure conditions ensure that sufficient gas enters.

When the filtering device is connected to the backpressure element, the gas flow fed in from the filtering device is greater than the gas flow carried in the duct, and the filtering device has an opening leading to the main gas flow. In the case of direct gas supply to the duct in the backpressure element, the opening allows pressure equalization upstream of the measuring device since the excess gas is fed back into the main gas flow. The pressure conditions or opening size prevent "impure" gas from entering the filtering device upstream of the transition to the duct via the opening.

Finally, the filtering device can open in such a way upstream of the backpressure element that the gas portion is fed in with a direction of flow parallel to the direction of flow of the main gas portion, thereby making it possible to ensure that the flow conditions and pressure conditions in the main gas flow are affected only insignificantly, despite the feeding in of the gas portion.

According to a particularly expedient embodiment of the invention, the gas meter is embodied in a rotationally symmetrical manner in the region of the filtering device and, if appropriate, also of the prefiltering device, in particular the chambers thereof, that is to say that a concentric construction around the tube carrying the gas is obtained. Such an embodiment is expedient for manufacturing reasons since it is then possible to use substantially cylindrical components and, furthermore, such a shape also represents a simple means of achieving the fluid-mechanical filtering effects in the region of the filtering device and, if appropriate, also of the prefiltering device.

Finally, a device for producing a feed pressure for separating the gas portion from the main gas flow, in particular in the form of a constriction in the cross section of the tube carrying the gas or by means of a grille, preferably a flow-straightening grille, can be provided. The use of a grille, in particular, is expedient since the grille has a straightening function, especially if it is arranged upstream of a backpressure element with an integrated measuring device.

BRIEF DESCRIPTION OF THE DRAWINGS

Further advantages, features and details of the invention will emerge from the illustrative embodiments described below and with reference to the drawing, in which.

DETAILED DESCRIPTION OF EXAMPLARY EMBODIMENTS

Figure 1:
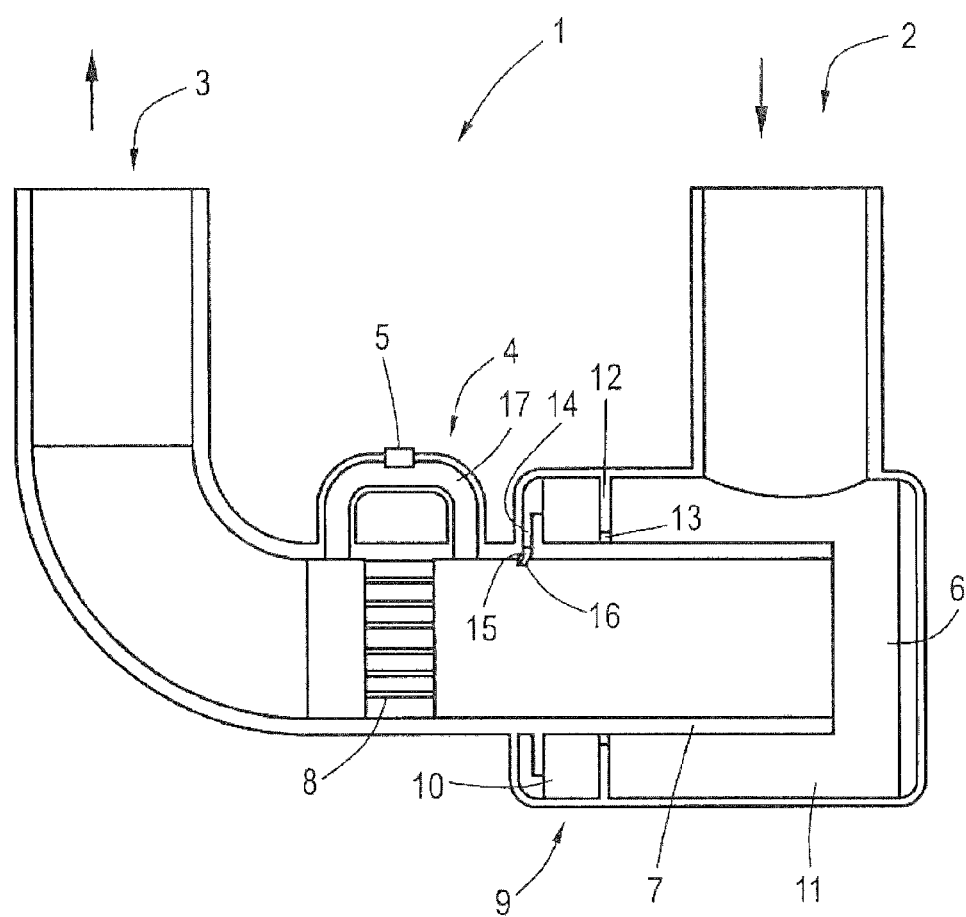
FIG. 1 shows a diagrammatic representation of a gas meter according to the invention in a first embodiment, having an injection device for the high-purity gas portion, in longitudinal section.

FIG. 1 shows a diagrammatic sectioned representation of a gas meter 1 according to the invention in a first embodiment. The gas meter 1, which furthermore has a separate housing to enclose it if appropriate, comprises a gas inlet 2, a gas outlet 3 and a measuring section 4 containing a measuring device 5, which, in the illustrative embodiment shown, is a chip-based microthermal sensor device. The gas inlet 2 and the gas outlet 3 are formed essentially by means of corresponding tubular components or sections.

Arranged downstream of the gas inlet 2 is a prefiltering device 6 which, in the example shown, is designed as a fluid-mechanical filter. In the prefiltering device 6, relatively coarse dirt particles contained in the inflowing gas are filtered out, said particles collecting in the region of the bottom of the prefiltering device 6, which in this case is substantially cylindrical. This is therefore a dust trap. The gas flows into the prefiltering device 6, into which a tube 7 serving subsequently to guide the main gas flow projects. The tube 7 extends over virtually the entire cross section of the gas inlet 2 or of the corresponding tube section, thus necessarily forcing the inflowing gas to perform a rotary motion about the tube 7. As a result, the coarser and hence heavier particles settle on the bottom of the chamber 11 of the prefiltering device 6. The majority of the inflowing gas prefiltered in this way then enters the tube 7, where it flows onward. Arranged in the tube 7 is a backpressure element 8, which has corresponding apertures through which the gas passes. The gas 7 then enters the following section of the tube 7, which then leads to the gas outlet 3.

Arranged downstream of the prefiltering device 6 is a filtering device 9 comprising a chamber 10, which likewise extends around the tube 7 in a rotationally symmetrical manner and which communicates with the prefiltering device 6 or the cylindrical chamber 11 forming the latter. The two chambers 10, 11 are separated from one another by a wall 12, but an annular peripheral opening 13 is provided, allowing the prepurified gas to pass from chamber 11 to chamber 10. The wall 12 and the opening 13 are dimensioned in such a way that only a small gas quantity, i.e. a small gas portion of the total inflowing gas, enters the chamber 10. In this filtering device 9 or chamber 10, in which there is virtually no flow, even the finest particles can now precipitate, that is to say that fine dust comprising particles of a few μm in size can consequently also be filtered out in the filtering device 9, collecting on the bottom of the chamber. That is to say that the gas in chamber 10 has consequently been filtered twice. This gas is then fed to the measuring device, and therefore said device is supplied with (virtually) 100% high-purity gas.

For this purpose, there is a duct 14 branching off from chamber 10 and opening into a feed opening 15 in the wall of the tube 7. Associated with the feed opening 15 is a flow guiding device 16, by means of which the high-purity gas from chamber 10 flowing into the tube 7 is deflected and has impressed upon it a motion component along the tube wall. That is to say that the inflowing gas portion does not flow vertically into the tube 7, where it would mix immediately with the main gas flow flowing in the tube; on the contrary, this injected flow is aligned parallel to the main flow and slides along the tube wall. During this process, this injected gas displaces the "contaminated" main gas flow, and it is then therefore virtually 100% high-purity gas which flows along the wall.

As FIG. 1 shows, a bypass duct 17 branches off just downstream of the feed opening 15, when viewed in the direction of flow, said bypass duct forming the measuring section 4, in which the measuring device 5 is arranged. The high-purity gas flowing along the tube wall thus flows only a very short distance along the tube wall and then enters directly into the bypass duct 17, which consequently carries virtually 100% high-purity gas from the filtering device 9. This gas passes to the measuring device 5, which is consequently supplied only with this high-purity gas. Downstream of the backpressure element 8, the bypass 17 branching off upstream of the backpressure element 8 reenters the tube 7 downstream of the backpressure element 8, and therefore the gas portion carried in the bypass 17 is returned.

Consequently, it is thereby possible, on the one hand, to ensure that the highly sensitive measuring device 5 is supplied exclusively with a high-purity gas, that is to say that any dirt particles cannot affect the measurement. By means of the injection of the high-purity gas portion directly upstream of the branch for the bypass 17, which takes place by virtue of a vacuum established in the duct 14 owing to the main gas flow in the measuring tube 7, it is furthermore ensured that the bypass duct 17 is also supplied exclusively with this high-purity gas. Moreover, it is ensured that, in the course of the filtering of the gas to remove even the finest particles, there is no effect on the pressure conditions since only a very small gas portion relative to the total inflowing quantity of gas is subjected to very fine filtering, whereas the vast majority of the gas is subjected only to prefiltering and passes to the backpressure element 8 as a main flow via the tube 7 without impairment by the small injection flow comprising the high-purity gas portion.

Figure 2:
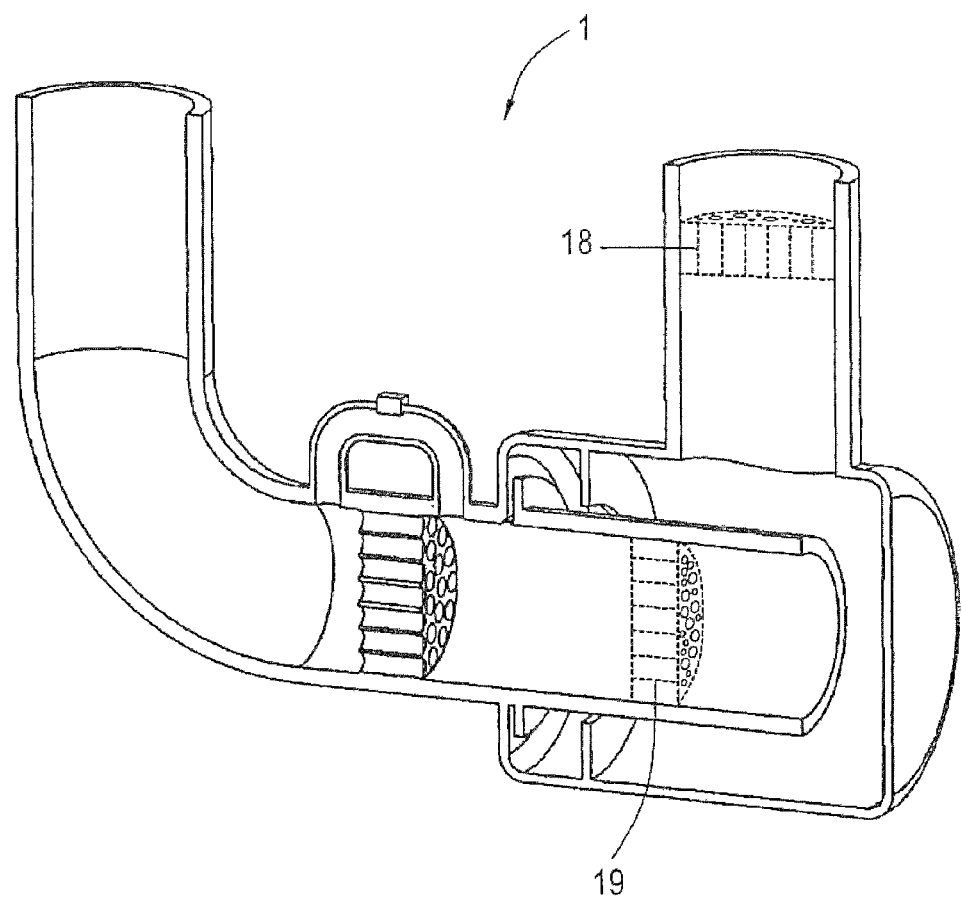
FIG. 2 shows the sectional view from FIG. 1 in perspective.

FIG. 2 shows the gas meter 1 from FIG. 1 in a perspective view, in which the essential details are illustrated once again. Optional filter elements 18, 19, which can also be inserted in the region of the gas inlet 2 or at the inlet of the tube 7, thus providing additional filter levels there for prefiltering, are furthermore shown only in dashed lines.

Figure 3:
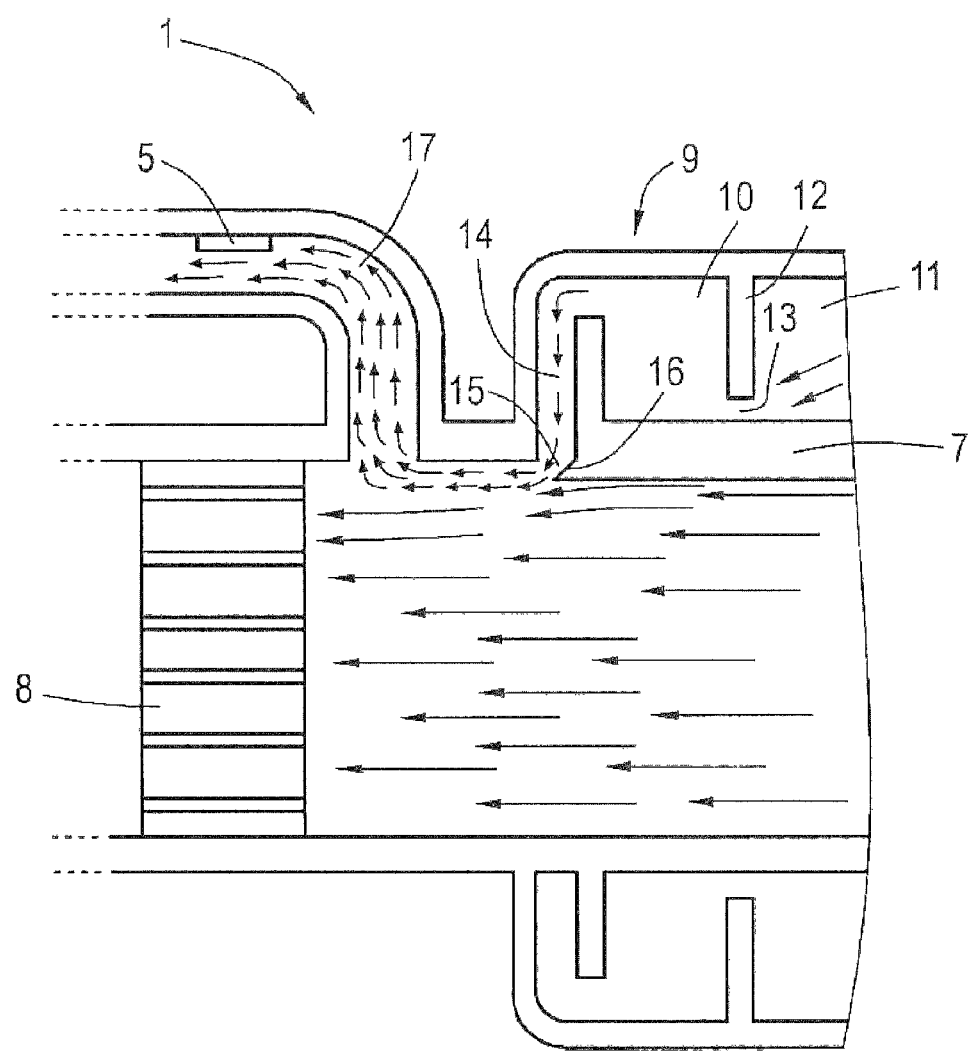
FIG. 3 shows an enlarged detail in the region of the injection device and of the bypass duct branch.

FIG. 3 shows, in the form of an enlarged partial view, the region of the gas meter 1 in which the high-purity gas is injected from chamber 10 of the filtering device 9.

Two different grades of gas are shown, namely, on the one hand, the gas which has only been prepurified, i.e. the main gas flow, which is indicated by the long arrows. The gas purified to a high purity from chamber 10, i.e. the injection flow, is also shown, being indicated by the significantly shorter arrows.

It can be seen, on the one hand, that the prepurified gas coming from chamber 11 flows in the direction of chamber 10 and enters the latter, where precipitation of even very fine particles occurs. Owing to the arrangement of the wall 12 and of the appropriate dimensioning of the opening 13, only an extremely small flow occurs in chamber 10, allowing these particles to precipitate readily as well.

FIG. 3 furthermore shows that the prepurified gas in the tube 7 flows in the direction of the backpressure element 8. Initially, it also flows in the region of the upper wall of the tube 7, until it reaches the area of the feed opening 15. There, the high-purity gas flowing via the duct 14 to the feed opening 15 is injected by virtue of the partial vacuum prevailing there, resulting from the flow of the main gas stream. This injected gas flow is deflected by means of the flow guiding device 16, e.g. an oblique edge, substantially parallel to the adjacent wall of the tube 7 and hence parallel to the direction of flow of the main gas, ensuring that this injection flow continues to flow along the wall of the tube 7. As FIG. 3 clearly shows, the main gas flow is displaced locally during this process, and consequently, as it were, two stratified flows are present in this tube wall region, namely, on the one hand, the injection flow adjacent to the wall and, on the other hand, the main gas flow. Owing, in particular, to the deflection by means of the flow guiding device 16, mixing of these two flows is avoided since the flow guiding device prevents the injection flow from flowing in vertically. The "width" of the injection flow relative to the longitudinal axis of the tube 7 depends on the geometry of the feed opening 15. This can be embodied as a simple hole but embodiment as a slot or as a slotted nozzle is also conceivable, with the result that a correspondingly wide injection flow is produced. This slot width is preferably matched to the diameter of the downstream bypass duct 17.

As FIG. 3 furthermore shows, the branch for the bypass duct 17 is provided immediately downstream of the feed opening 15. That is to say that the branch is provided in the region in which it is virtually only the high-purity injection flow, i.e. the high-purity gas portion, which is present. As FIG. 3 shows, (virtually) 100% of the high-purity gas enters the bypass duct 17 and flows past the measuring device 5, that is to say that it is exclusively this gas which is used as a basis for measurement. The main flow, in contrast, flows to the backpressure element and through the latter to the gas outlet 3, wherein the gas carried in the bypass 17 is also fed back downstream of the backpressure element 8.

Figure 4:
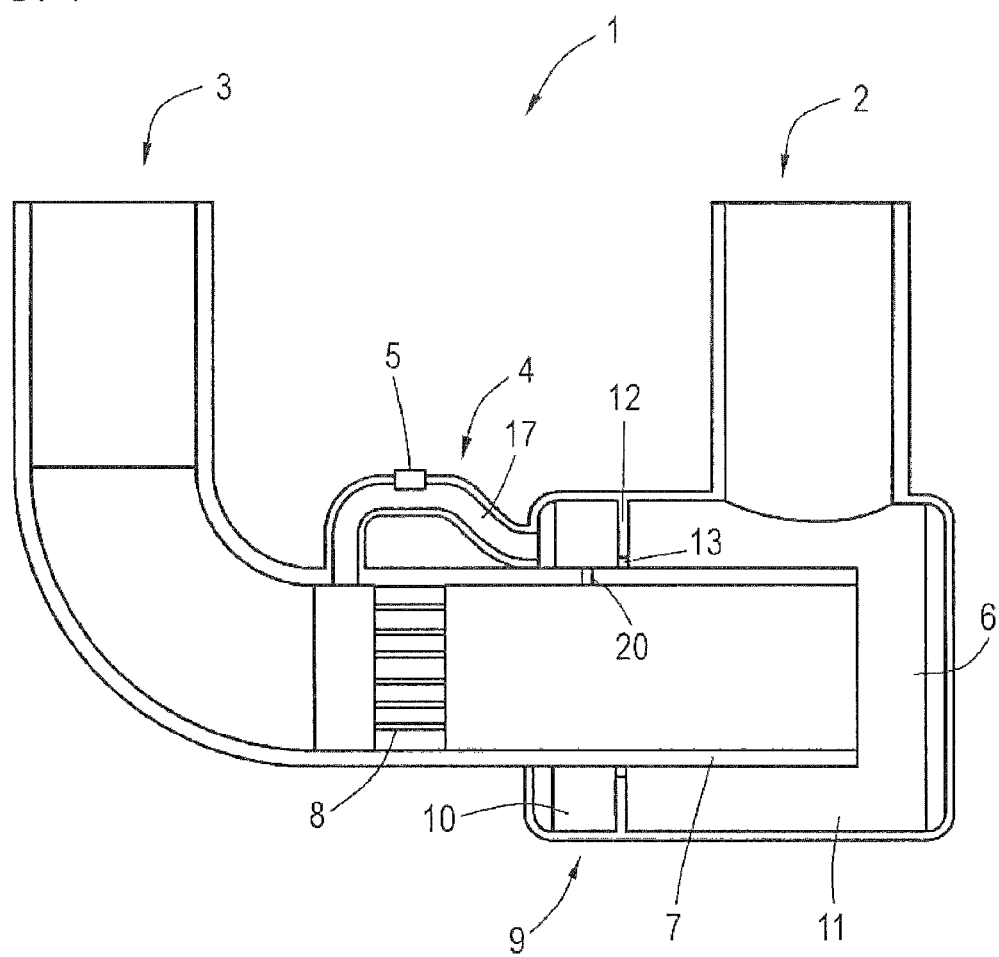
FIG. 4 shows a second embodiment of a gas meter according to the invention with a bypass duct branching off directly from the filtering device, in longitudinal section.

FIG. 4 shows another embodiment of a gas meter 1 according to the invention, wherein identical reference signs are used for identical components. Once again, a gas inlet 2, a gas outlet 3 and a measuring section 4, here too in the form of a bypass duct 17 with an integrated measuring device 5 in the form of a chip-based microthermal sensor, are provided. In the same way, a prefiltering device 6 and a tube 7 carrying the main gas flow, in which a backpressure element 8 is arranged, are provided. Once again, a filtering device comprising a chamber 10 arranged downstream of the chamber 11 of the prefiltering device, are likewise provided, wherein the two chambers 10, 11 are once again separated by means of a wall 12. The gas is allowed to pass through by an annular opening 13. That is to say that here too, all the inflowing gas is once again prefiltered by means of the prefiltering device 6, after which only the very small gas portion which enters chamber 10 via the opening 13 is subject to fine filtering.

Unlike the embodiment described above, the bypass duct 17 here branches directly off from the chamber 10 of the filtering device 9, that is to say that here no injection is performed; on the contrary, the high-purity gas is passed directly into the bypass duct 17. Once again, the bypass duct 17 opens downstream of the backpressure element 8, with the result that the high-purity gas fed to the measuring device 5 is fed back into the main gas flow after measurement.

In this embodiment of the invention too, only a very small fraction of the total gas fed in is therefore subjected to very fine filtering, and thus, here too, there is no pressure loss due to this filtering.

As FIG. 4 furthermore shows, at least one feed opening 20, which leads from chamber 10 into the tube 7, is provided as an option, if appropriate. This chamber serves to harmonize the conditions of flow into the bypass duct 17 and, of course, this feed opening should be designed in such a way that chamber 10 containing the high-purity gas is always at a higher pressure than the gas in the tube 7 upstream of the backpressure element 8. Otherwise, the "contaminated" gas would flow back into chamber 10 from the tube 7 via the feed opening 20, and this must not happen.

Figure 5:
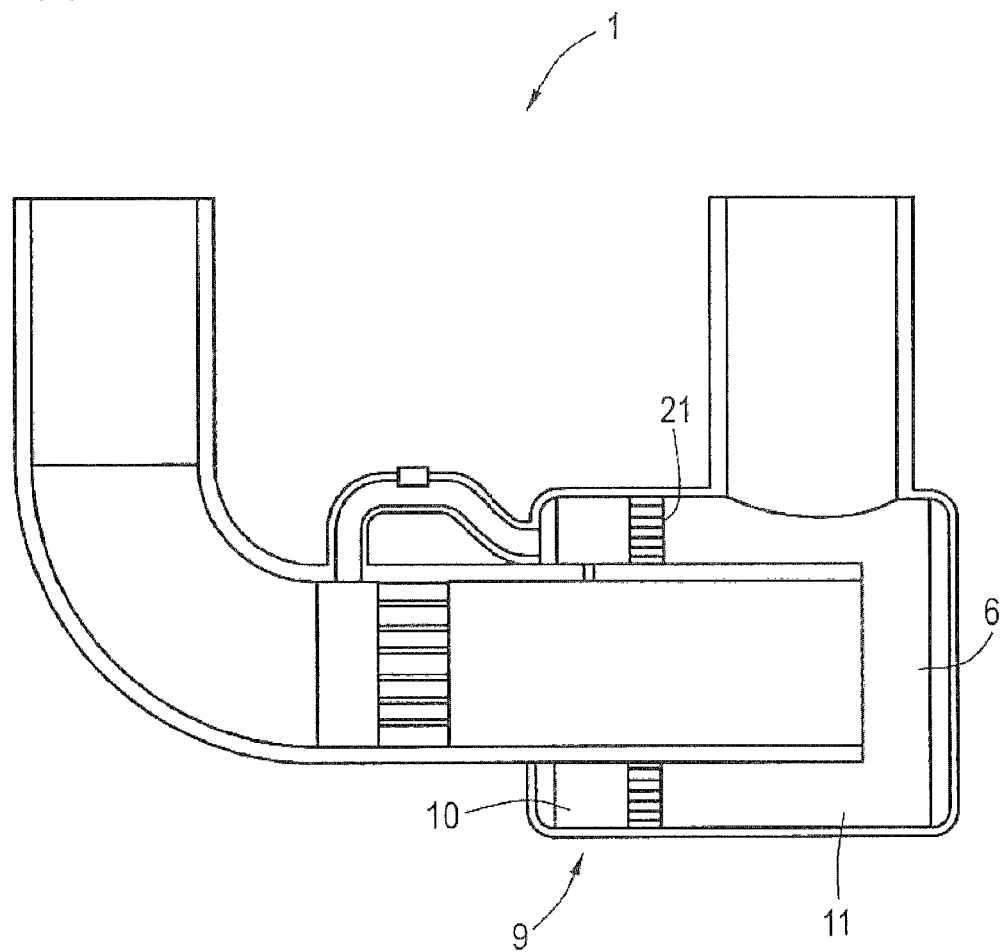
FIG. 5 shows a gas meter corresponding to FIG. 4 having a filter element assigned to the filtering device.

Finally, FIG. 5 shows an embodiment of a gas meter 1 according to the invention, which corresponds in construction almost completely to that in FIG. 4, for which reason to this extent attention is drawn to the relevant description. The only difference here is the separation of the chamber 10 of the filtering device 9 from the chamber 11 of the prefiltering device 6. Whereas, in the embodiment according to FIG. 4, a wall 12 and an opening 13 are provided, a filter element 21 in the form of an annular disk, by means of which the two chambers 10, 11 are separated, is provided in the embodiment according to FIG. 5. This filter element 21 should be designed in such a way that its cross section is at least three to four times that of the bypass duct 17, that is to say of the bypass flow entering the latter, thus providing an adequate inflow of gas into chamber 10.

Of course, a filter element 21 of this kind can also be provided in the embodiment of the gas meter shown in FIGS. 1-3 instead of the wall 12 and opening 13 there.

Figure 6:
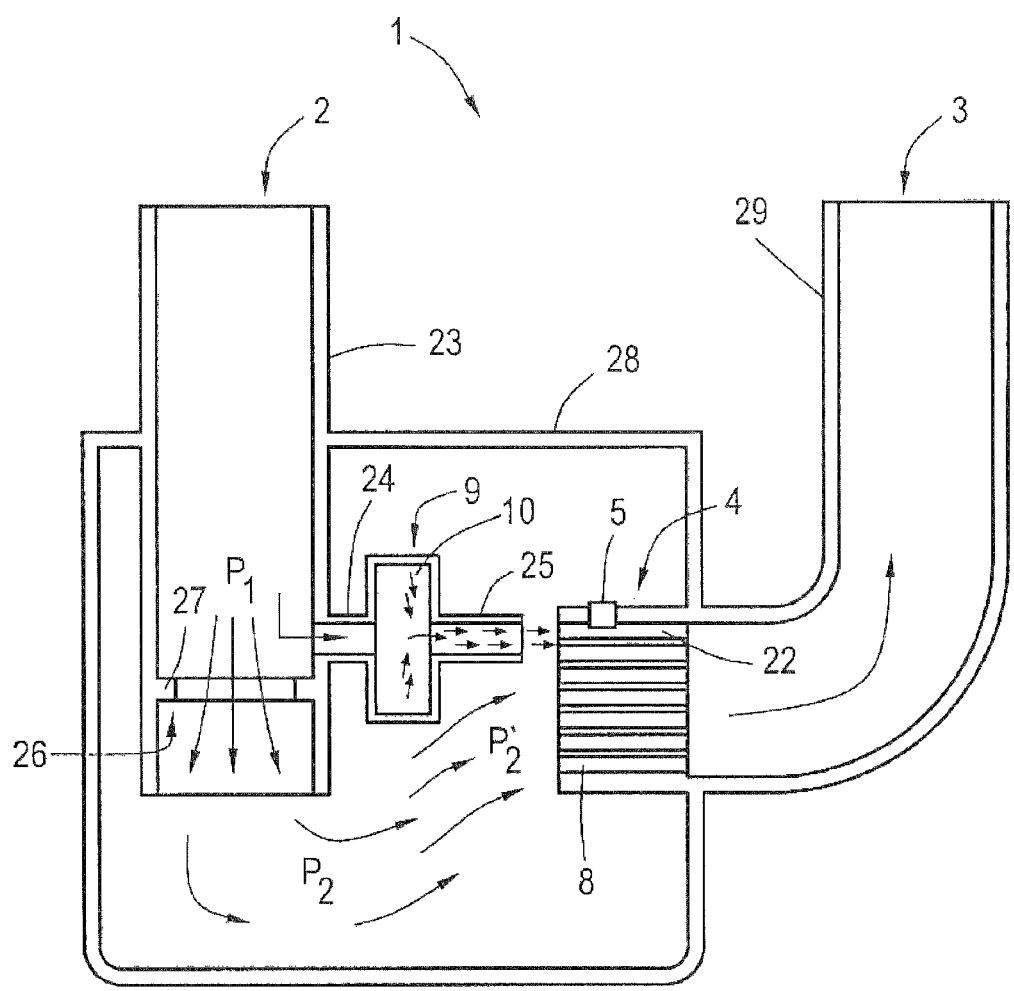
FIG. 6 shows a third embodiment of a gas meter according to the invention having a measuring device integrated into the backpressure element.

FIG. 6 shows a third embodiment of a gas meter 1 according to the invention in the form of a sectioned diagrammatic representation. It has a gas inlet 2 and a gas outlet 3, each formed by corresponding tubes, and a measuring section 4 containing a measuring device 5, once again preferably in the form of a microthermal sensor chip. In the illustrative embodiment shown, the measuring device 5 is integrated into a backpressure element 8 inserted into the inlet of the tube leading to the gas outlet 3, and the gas portion to be measured flows into a duct 22 in the backpressure element 8, said duct 22 thus once again, as it were, forming a bypass in which only the high-purity gas portion is carried and in which measurement is performed.

Once again, a filtering device 9 is provided, and, in the illustrative embodiment shown, said filtering device branches off substantially at right angles, via a tube section 24, from the tube 23 leading to the gas inlet. The filtering device 9 has a larger-volume chamber 10, from which there leads a further tube section 25, said tube section opening a very short distance upstream of the inlet to the duct 22, i.e. to the region of the measuring device 5. A small part of the main gas flow fed in enters the filtering device 9, and coarse prepurification can take place by virtue of the flow momentum owing to the angled branch, which is perpendicular to the main direction of flow. Downstream of the branch there is a device 26 for producing a feed pressure, in the example shown in the form of a constriction 27 of the cross section, resulting in a pressure $P_1$ in the region where the gas is fed in and a pressure $P_2$ in the region downstream thereof. The pressure $P_1$ upstream of the branch leading to the filtering device 9 is higher than the pressure $P_2$ in the downstream volume delimited by the housing 28.

The gas fed in then flows initially through the tube 23, wherein the main gas flow, i.e. the major portion, flows on into the volume of the housing 28. Only a very small part flows to the filtering device 9, where even very fine dust particles are filtered out of this gas portion. Once again, this can be accomplished by precipitation in chamber 10, wherein it is, of course, also possible for corresponding separate, additionally integrated filtering means and the like to be provided. The flow resistance in the region of the filtering device 9 should be as low as possible, this ultimately being achieved by the widening of the flow cross section in the transition to chamber 10.

The gas portion purified in the filtering device 9, which, here too, is once again indicated by the short arrows, emerges at the tube section 25. The outlet end lies directly opposite or as a direct extension of the duct 22 containing the measuring device 5, with the result that the duct 22 exclusively contains the high-purity gas which is subjected to measurement. Otherwise, the backpressure element 8 is impinged upon by the main gas flow, as illustrated by the long arrows, wherein a pressure $P_2$ may be established in the region upstream of the backpressure element due to the conditions. Here too, therefore, the high-purity gas portion is again fed into the main gas flow, but in such a way that, on the one hand, the inflow directions are substantially parallel and, on the other hand, the flow profile and the pressure conditions in the region of inflow to the backpressure element 8 are changed only insignificantly, if at all, by the feeding-in of the high-purity gas portion, although the main gas flow is displaced by the high-purity gas portion in this region. All the gas then emerges via the tube 29 and the gas outlet 3.

Furthermore, the main gas flow can likewise be purified at least coarsely in the housing 28. The housing 28 forms a dust trap, in which any relatively large entrained particles collect on the bottom of the housing, this coarse purification thus preventing clogging of the backpressure element 8 in any way.

Figure 7:
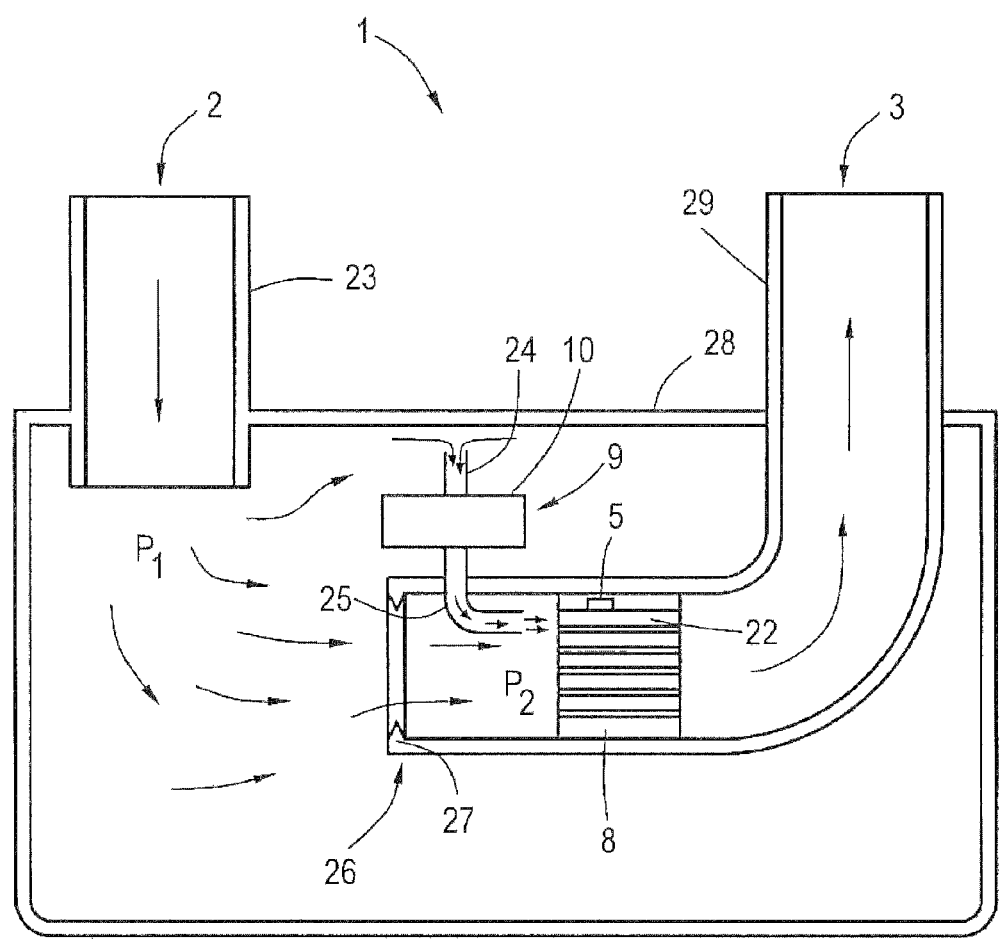
FIG. 7 shows a fourth embodiment of a gas meter according to the invention having a measuring device integrated into the backpressure element.

FIG. 7 shows another embodiment of a gas meter 1, again comprising a gas inlet 2, formed by a tube 23, and a gas outlet 3, formed by a tube 29, in which, here too, there is arranged a backpressure element 8, into which the measuring device 5 is integrated and arranged in a duct 22 of the backpressure element 8. The housing can once again form a dust trap, in which prepurification of the gas fed in takes place. There is a pressure $P_1$ in the housing 28. A device 26 for producing a feed pressure, once again in the form of a constriction 27, is provided upstream of the backpressure element 8, resulting upstream of the backpressure element in a pressure $P_2$ which is lower than the pressure $P_1$.

Once again, a filtering device 9 is provided, having a chamber 10, which is either embodied as a filter itself or into which, or upstream of which, appropriate filtering means are provided in order to filter out even the finest particles. A tube section 24 opens freely into the volume of the housing 28, i.e. into the region in which the main gas collects, said gas having been prepurified by means of the housing 28, if appropriate. Via this section, a very small gas portion enters which requires very fine purification and is subsequently to be subjected to measurement.

From chamber 10, a tube section 25 leads through tube and, here too, it opens directly upstream of the duct 22, though at a distance therefrom, and therefore upstream of the measuring device 5. Here too, therefore, the duct 22 is flooded exclusively with gas from the filtering device 9, thus ensuring that the measuring device 5 is supplied exclusively with this gas.

Since the tube section 25 opens upstream of the backpressure element 8, the high-purity gas portion is, similarly to the embodiment shown in FIG. 6, once again fed into the main gas flow upstream of the backpressure element 8, wherein the feed direction is once again parallel to the direction of the main gas flow. The high-purity gas portion displaces the main gas flow locally but without significantly affecting the flow and pressure conditions. In this embodiment, the high-purity gas portion is fed in the region in which a pressure reduction to the pressure $P_2$, due to the constriction 27 in the cross section, has already taken place. The gas portion to be purified which enters the filtering device 9 can therefore be taken from the volume at any desired point within the housing 28, ideally where very high dust filtering through the filtering action of the housing 28 has already taken place. In the illustrative embodiment shown, the inlet via the tube section 24 is therefore also situated in the upper region of the housing.

Figure 8:
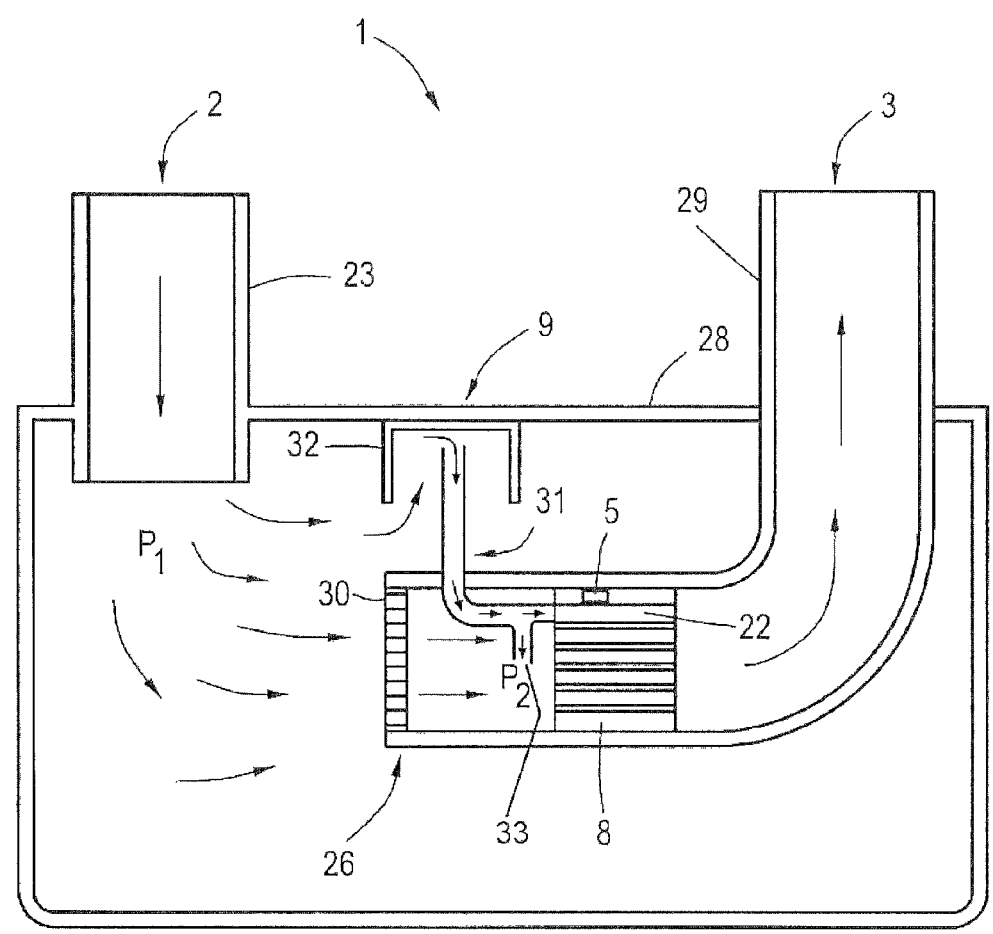
FIG. 8 shows a fourth embodiment of a gas meter according to the invention having a measuring device integrated into the backpressure element.

A fifth embodiment of a gas meter according to the invention, having a gas inlet 2 and a gas outlet 3 together with a housing 28, is shown by FIG. 8. The gas at a pressure $P_1$ flowing in via tube 23 diffuses in the housing 28, which, here too, preferably serves as a prefilter. The backpressure element 8 is once again arranged in tube 29, wherein the measuring device 5 is once again integrated into a duct 22. A device 27 for reducing the pressure, here in the form of a grille 30, is furthermore provided in the tube 29, upstream of the backpressure element 8, resulting in a lower pressure $P_2$ in the region upstream of the backpressure element 8.

A filtering device 9 is once again provided, here consisting of a tube 31, the upper, open end of which opens into a, preferably cylindrical, ring 32, with the result that the gas entering tube 31 flows as it were through a kind of labyrinth, whereby the filtering action is achieved.

In the illustrative embodiment shown, tube 31 opens directly at the backpressure element 8, and is therefore connected directly to the measurement duct 22. Since the cross section of tube 31 is larger than that of the duct 22, and therefore a larger partial flow of high-purity gas is fed in via the tube than flows in the measurement duct, an opening 33 is provided, via which the excess gas emerges into the region upstream of the backpressure element 8, and is thus fed into the main gas flow there. The gas portion to be measured is fed back into the main gas flow only downstream of the backpressure element 8. Via the opening 33, pressure equalization is effected upstream of the measuring device 5.

The figures are merely diagrammatic representations. It is, of course, also possible for the geometries of the corresponding meter sections to be designed differently, just as it is, of course, also possible for different geometries to be selected for the filtering device, which here extends in a rotationally symmetrical manner around the tube 7. Of course, appropriate evaluation electronics are also provided, communicating with the measuring device 5 and acquiring, evaluating and displaying the measured values or sensor signals recorded there. In the case of the illustrative embodiments in which there is no device for producing a feed pressure, if appropriate with alignment of the flow, e.g. by means of a grille, it is, of course, also possible for such means to be provided.

The invention claimed is:

1. A gas meter comprising:
a gas inlet, a gas outlet and a measuring section,
a measuring device arranged in the measuring section,
a filtering device, for removing particulate impurities, arranged downstream of the gas inlet, wherein the filtering device is supplied with and purifies only a gas portion which is diverted from a main gas flow, wherein the purified gas portion is subsequently fed to the measuring device arranged downstream of the filtering device,
a gas-permeable connection to the main gas flow in the form of a feed opening arranged downstream of the filtering device and upstream of the measuring device, and
a backpressure element configured to establish a predetermined air pressure in the measuring section,
wherein the purified gas portion is fed back at least in part into the main gas flow upstream of the backpressure element through the feed opening.

2. The gas meter as claimed in claim 1, wherein a prefiltering device, which prefilters all the gas fed in, is arranged upstream of the filtering device, and the gas portion fed to the filtering device is taken from the prefiltered gas.

3. The gas meter as claimed in claim 2, wherein the filtering device and the prefiltering device, extend concentrically around a tube carrying the gas.

4. The gas meter as claimed in claim 1, wherein the filtering device comprises a chamber into which gas flows, wherein the chamber comprises a filter.

5. The gas meter as claimed in claim 4, wherein a duct leads from the chamber of the filtering device to the feed opening.

6. The gas meter as claimed in claim 4, wherein said filter is the chamber in the region of the gas inlet.

7. The gas meter as claimed in claim 1, wherein the measuring device is arranged in a bypass duct which communicates directly or indirectly with the filtering device.

8. The gas meter as claimed in claim 7, wherein the bypass duct opens, on the one hand, directly into a chamber of the filtering device and, on the other hand, into a tube carrying the gas.

9. The gas meter as claimed in claim 8, wherein at least one feed opening leads from the chamber into the tube.

10. The gas meter as claimed in claim 9, wherein the feed opening is embodied as a slot extending transversely to the longitudinal axis of the tube.

11. The gas meter as claimed in claim 9, wherein a flow guiding device, by means of which the inflowing gas portion is deflected in the direction of the bypass duct or of the measuring device, is provided in the region of the feed opening.

12. The gas meter as claimed in claim 7, wherein the bypass duct is branched off from a tube carrying the gas, wherein the filtering device has a feed opening which leads into the tube upstream of the branch for the bypass duct and via which the purified gas portion is fed to the gas flowing in the tube.

13. The gas meter as claimed in claim 1, wherein the measuring device is arranged on a wall of a tube carrying the gas, wherein the filtering device has a feed opening which leads into the tube upstream of the measuring device and via which the purified gas portion is fed to the gas flowing in the tube.

14. The gas meter as claimed in claim 1, wherein the filtering device opens upstream of a backpressure element, directly upstream of which the measuring device is arranged or into which the measuring device is integrated in a duct, and to which the main gas flow is fed, or is connected thereto.

15. The gas meter as claimed in claim 14, wherein the filtering device branches off from a tube carrying the gas or has a gas inlet section open toward the housing volume of the gas meter.

16. The gas meter as claimed in claim 15, wherein, when the filtering device is connected to the backpressure element, the gas flow fed in from the filtering device is greater than the gas flow carried in the duct, and the filtering device has an opening leading to the main gas flow.

17. The gas meter as claimed in claim 14, wherein the filtering device opens upstream of the backpressure element in such a way that the gas portion is fed in with a direction of flow parallel to the direction of flow of the main gas portion.

18. The gas meter as claimed in claim 1, comprising a device for producing a feed pressure for separating the gas portion from the main gas flow.

19. The gas meter as claimed in claim 18, wherein said device for producing a feed pressure for separating the gas portion from the main gas flow is in the form of a constriction in the cross section of the tube carrying the gas or by means of a grille.

20. The gas meter as claimed in claim 19, wherein said grille is a flow-straightening grille.

21. The gas meter as claimed in claim 1, wherein said measuring device is for thermal flow measurement.

* * * * *